United States Patent
Wu et al.

(10) Patent No.: US 8,768,172 B2
(45) Date of Patent: Jul. 1, 2014

(54) METHODS AND SYSTEMS FOR BLOCK ALIGNMENT IN A COMMUNICATION SYSTEM

(75) Inventors: Sheng Wu, Irvington, NY (US); Michael Bottiglieri, River Vale, NJ (US)

(73) Assignee: Fujitsu Limited, Kawasaki-shi (JP)

( * ) Notice: Subject to any disclaimer, the term of this patent is extended or adjusted under 35 U.S.C. 154(b) by 224 days.

(21) Appl. No.: 13/243,215

(22) Filed: Sep. 23, 2011

(65) Prior Publication Data

US 2013/0077962 A1 Mar. 28, 2013

(51) Int. Cl.
*H04B 10/00* (2013.01)

(52) U.S. Cl.
USPC .......................................... 398/154; 398/202

(58) Field of Classification Search
USPC .................... 398/202–214, 154, 155
See application file for complete search history.

(56) References Cited

U.S. PATENT DOCUMENTS

| | | | |
|---|---|---|---|
| 5,390,041 A * | 2/1995 | Knecht et al. ................. | 398/182 |
| 6,088,337 A * | 7/2000 | Eastmond et al. ............ | 370/280 |
| 6,674,731 B1 * | 1/2004 | Bradshaw et al. ............ | 370/316 |
| 6,721,710 B1 * | 4/2004 | Lueck et al. .................. | 704/500 |
| 7,570,661 B2 * | 8/2009 | Miller et al. .................. | 370/469 |
| 7,673,072 B2 * | 3/2010 | Boucher et al. ............... | 709/245 |
| 7,729,389 B1 * | 6/2010 | Lo .................................. | 370/535 |
| 7,912,057 B2 * | 3/2011 | Petry et al. .................... | 370/390 |
| 8,233,507 B1 * | 7/2012 | Lo .................................. | 370/537 |
| 8,245,095 B2 * | 8/2012 | Ou et al. ........................ | 714/752 |
| 2006/0256875 A1 * | 11/2006 | McClellan .................... | 375/242 |
| 2009/0276681 A1 * | 11/2009 | Ou et al. ....................... | 714/752 |
| 2011/0075683 A1 * | 3/2011 | McClellan .................... | 370/474 |
| 2013/0077962 A1 * | 3/2013 | Wu et al. ......................... | 398/25 |

* cited by examiner

*Primary Examiner* — Agustin Bello
(74) *Attorney, Agent, or Firm* — Baker Botts L.L.P.

(57) ABSTRACT

A method may include receiving a stream of datagrams, the datagrams having a first bit length. The method may also include selecting a block of bits from consecutively-received datagrams, the block having a second bit length greater than the first bit length. The method may additionally include determining whether a particular data field is present at a particular bit position within the block. The method may further include outputting the block as a valid block in response to determining that the particular data field is present at the particular bit position. The method may additionally include, in response to determining that the particular data field is not present at the particular bit position: discarding a received datagram from the stream of datagrams; and repeating the receiving, selecting, determining, and discarding steps until a determination is made that the particular data field is present at the particular bit position.

15 Claims, 3 Drawing Sheets

US 8,768,172 B2

METHODS AND SYSTEMS FOR BLOCK ALIGNMENT IN A COMMUNICATION SYSTEM

TECHNICAL FIELD OF THE INVENTION

The present invention relates generally to optical networks and, more particularly, to a method and system for block alignment in a communication system.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths, thereby increasing network capacity.

An optical signal comprised of disparate wavelengths experiences optical dispersion, an often undesirable phenomenon that causes the separation of an optical wave into spectral components with different frequencies. Optical dispersion occurs because the differing wavelengths propagate at differing speeds. The separation of an optical wave into its respective channels due to optical dispersion may require optical dispersion compensation for the particular optical signal.

In accordance with prevalent communications standards and/or protocols, nodes may communicate information in the form of Ethernet datagrams known as blocks. The size of blocks may depend on the bit rate of communication used to communicate such blocks. For example, in 10/40/100G BASE-R Physical Coding Sublayer (BR-PCS) communication, such blocks may be 66 bits in length. As another example, in 40 Gb/s Ethernet over Optical Transport Unit (OTU) communication, such blocks may be 1027 bits in length. However, prevalent optical communications standards and/or protocols are often configured such that a datagram of a different size is used to transmit data over a fiber 28 or other transmission medium. For example, in 10 Gb/s ("10G") communication, data may be transmitted in datagrams (e.g., packets or frames) 64 bits in length. As another example, in 40 Gb/s Ethernet over OTU communication ("40G"), such datagrams may be 1024 bits in length. As a further example, in 100 Gb/s ("100G") communication, such datagrams may be 40 bits in length. Accordingly, a 10G transmitter may reassemble a series of 66-bit blocks into 64-bit datagrams for communication wherein each 64-bit datagram may include portions of one or more 66-bit blocks. A corresponding 10G receiver may receive the series of 64-bit datagrams and reassemble such datagrams into 66-bit Ethernet blocks. Similarly, a 40G transmitter may reassemble a series of 1027-bit blocks into 1024-bit datagrams for communication wherein each 1024-bit datagram may include portions of one or more 1027-bit blocks and a corresponding 40G receiver may receive the series of 1024-bit datagrams and reassemble such datagrams into 1027-bit Ethernet blocks. Also a 100G transmitter may reassemble a series of 66-bit blocks into 40-bit datagrams for communication wherein each 40-bit datagram may include portions of one or more 66-bit blocks and a corresponding 100G receiver may receive the series of 40-bit datagrams and reassemble such datagrams into 66-bit Ethernet blocks.

The process of reassembling Ethernet blocks by a receiver may be known as "block alignment." Block alignment may be performed by searching for a portion of an Ethernet block known as a synchronization header or "sync header." For example, a 66-bit BR PCS Ethernet block may include a two-bit sync header. As another example, a 1027-bit Ethernet over OTU block may include a three-bit sync header.

Because a sync header will generally appear in the same bit position of each Ethernet block, the boundaries of a block may be determined by the location of a sync header within a data stream. Accordingly, by finding a sync header in a data stream, a receiver may reassemble Ethernet blocks from a data stream.

Using traditional approaches, implementation of block alignment is challenging in terms of logic size and speed. In traditional approaches, a barrel shifter is used to shift the sync bits within a block in a single clock cycle. In the 10G case, such a barrel shifter requires 66 copies of 66-bit shift registers, which is logic consuming. Alternatively, 66 copies of 66:1 multiplexers are needed to build, which is equally logic consuming. In 40G case, the problem is even more pronounced, as a 1027-bit barrel shifter would be required.

SUMMARY

In accordance with a particular embodiment of the present invention, a method may include receiving a stream of datagrams, the datagrams having a first bit length. The method may also include selecting a block of bits from consecutively-received datagrams, the block having a second bit length greater than the first bit length. The method may additionally include determining whether a particular data field is present at a particular bit position within the block. The method may further include outputting the block as a valid block in response to determining that the particular data field is present at the particular bit position. The method may additionally include, in response to determining that the particular data field is not present at the particular bit position: discarding a received datagram from the stream of datagrams; and repeating the receiving, selecting, determining, and discarding steps until a determination is made that the particular data field is present at the particular bit position.

Technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
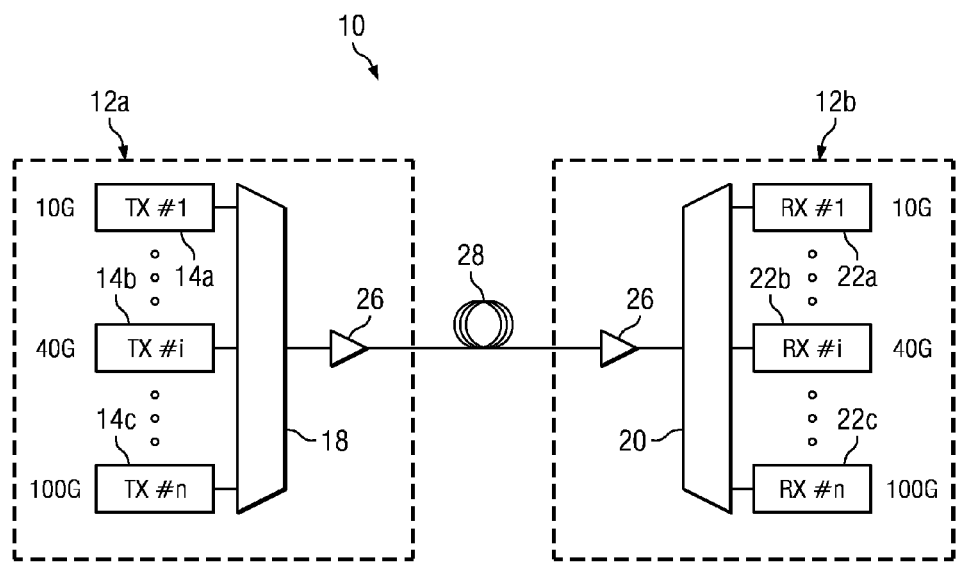
FIG. 1 illustrates a block diagram of an example optical network, in accordance with embodiments of the present disclosure.

FIG. 1 illustrates a block diagram of an example optical network 10, in accordance with embodiments of the present disclosure. Optical network 10 may include one or more optical fibers 28 operable to transport one or more optical signals communicated by components of the optical network 10. The components of optical network 10, coupled together by optical fiber 28, include nodes 12a and 12b. Although the optical network 10 is shown as a point-to-point optical network with terminal nodes, the optical network 10 may also be configured as a ring optical network, a mesh optical network, or any other suitable optical network or combination of optical networks, and may include any number of nodes intermediate to nodes 12a and 12b. The optical network 10 may be used in a short-haul metropolitan network, a long-haul intercity network, or any other suitable network or combination of networks.

Node 12a may include transmitters 14 (e.g., transmitters 14a, 14b, and 14c), a multiplexer 18, and an amplifier 26. Transmitters 14 may include any transmitter or other suitable device operable to transmit optical signals. Each transmitter 14 may be configured to receive information transmit a modulated optical signal at a certain wavelength. In optical networking, a wavelength of light is also referred to as a channel. Each transmitter 14 may also be configured to transmit this optically encoded information on the associated wavelength.

Multiplexer 18 may include any multiplexer or combination of multiplexers or other devices operable to combine different channels into one signal. Multiplexer 18 may be configured to receive and combine the disparate channels transmitted by transmitters 14 into an optical signal for communication along fibers 28.

Amplifier 26 may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy may be applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

After the multi-channel signal is transmitted from node 12a, the signal may travel over one or more optical fibers 28 to node 12b. An optical fiber 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10. Furthermore, as is discussed in more detail below, the fibers 28 may be high chromatic dispersion fibers (as an example only, standard single mode fiber (SSMF) or non-dispersion shifted fiber (NDSF)), low chromatic dispersion fibers (as an example only, non zero-dispersion-shifted fiber (NZ-DSF), such as E-LEAF fiber), or any other suitable fiber types. According to particular embodiments, different types of fiber 28 create the need for different dispersion compensation schemes to be applied to the signals, as discussed in further detail below.

Node 12b may be configured to receive signals transmitted over optical network 10. Node 12b may include an amplifier 26, a demultiplexer 20, and receivers 22 (e.g., receivers 22a). As described above, amplifier 26 may be used to amplify the WDM signal as it travels through the optical network 10.

Demultiplexer 20 may include any demultiplexer or other device configured to separate the disparate channels multiplexed using WDM, DWDM, or other suitable multi-channel multiplexing technique. Demultiplexer 20 may be configured to receive an optical signal carrying a plurality of multiplexed channels, demultiplex the disparate channels in the optical signal, and pass the disparate channels to different receivers 22.

Figure 2:
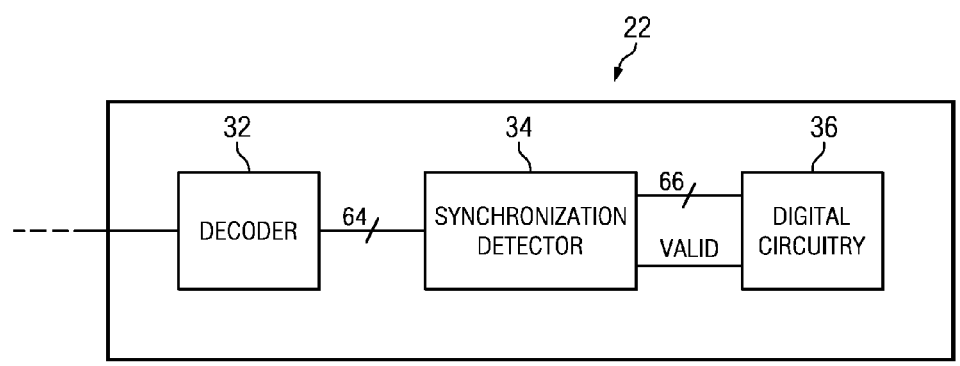
FIG. 2 illustrates a block diagram of an example receiver, in accordance with embodiments of the present disclosure.

Receivers 22 may include any receiver or other suitable device operable to receive an optical signal. Each receiver 22 may be configured to receive a channel of an optical signal carrying encoded information and demodulate the information into an electrical signal. An example receiver is depicted in FIG. 2, and described in greater detail below.

In operation, transmitters 14 of node 12a may transmit information at different bit rates and/or using different modulation techniques over different channels. For example, in the embodiment depicted in FIG. 1, transmitter 14a may be configured to transmit at 10 Gb/s, transmitter 14b may be configured to transmit at 40 Gb/s, and transmitter 14c may be configured to transmit at 100 Gb/s. The multiplexer 18 may combine these different channels into an optical signal and communicate the signal over an optical fiber. An amplifier 26 of node 12a may receive the optical signal, amplify the signal, and pass the signal over optical fiber 28 to node 12b.

Amplifier 26 of node 12b may amplify the signal communicated from node 12a. Demultiplexer 20 of node 12b may receive the signal, demultiplex the signal into the signal's constituent channels, and pass the signal's constituent channels. Each channel may be received by an associated receiver 22 of node 12b and processed. Receivers 22 of node 12b may receive information at different bit rates and/or using different modulation techniques over different channels. For example, in the embodiment depicted in FIG. 1, receiver 22a may be configured to transmit at 10 Gb/s, receiver 22b may be configured to transmit at 40 Gb/s, and receiver 22c may be configured to transmit at 100 Gb/s.

In accordance with prevalent communications standards and/or protocols, nodes 12 may communicate information in the form of Ethernet datagrams known as blocks. The size of blocks may depend on the bit rate of communication used to communicate such blocks. For example, in 10G or 100G communication, such blocks may be 66 bits in length. As another example, in 40G communication, such blocks may be 1027 bits in length. However, prevalent optical communications standards and/or protocols are often configured such that a datagram of a different size is used to transmit data over a fiber 28 or other transmission medium. For example, in 10G communication, data may be transmitted in datagrams (e.g., packets or frames) 64 bits in length. As another example, in 40G communication, such datagrams may be 1024 bit in length. As a further example, in 100G communication, such datagrams may be 40 bits in length. Accordingly, a 10G transmitter 14 may reassemble a series of 66-bit blocks into 64-bit datagrams for communication wherein each 64-bit datagram may include portions of one or more 66-bit blocks. A corresponding 10G receiver 22 may receive the series of 64-bit datagrams and reassemble such datagrams into 66-bit Ethernet blocks. Similarly, a 40G transmitter 14 may reassemble a series of 1027-bit blocks into 1024-bit datagrams for communication wherein each 1024-bit datagram may include portions of one or more 1027-bit blocks and a corresponding 40G receiver 22 may receive the series of 1024-bit datagrams and reassemble such datagrams into 1027-bit Ethernet blocks. Additionally, a 100G transmitter 14 may reassemble a series of 66-bit blocks into 40-bit datagrams for communication wherein each 40-bit datagram may include portions of one or more 66-bit blocks and a corresponding 100G receiver 22 may receive the series of 40-bit datagrams and reassemble such datagrams into 66-bit Ethernet blocks.

FIG. 2 illustrates a block diagram of an example receiver 22, in accordance with embodiments of the present disclosure. As shown in FIG. 2, receiver 22 may comprise a decoder 32, a synchronization detector 34, and digital circuitry 36. Decoder 32 may comprise any system, device, or apparatus configured to decode optical signals communication via a fiber 28 into electrical signals for processing by synchronization detector 34 and/or digital circuitry 36. For example, decoder 32 may comprise one or more photodetectors configured to generate electrical signals based on intensity of photonic energy incident upon such photodetectors.

Synchronization detector 34 may include any system, device, or apparatus configured to receive datagrams of a first bit length output by decoder 32 (e.g., 40 bits, 64 bits, 1024 bits) and reassemble the datagrams into Ethernet blocks of a second bit length (e.g., 66 bits, 1027 bits) based on detection of a sync header within the datagrams of the first bit length. Synchronization detector 34 may communicate blocks to digital circuitry 36, along with a signal indicating whether the blocks being communicated are valid (e.g., properly aligned).

Digital circuitry 36 may include any system, device, or apparatus (e.g., a processor, application-specific integrated circuit, digital signal process, microcontroller, etc.) configured to receive blocks and perform further processing upon such blocks, based on specifications and/or requirements of the specific receiver 22.

Figure 3:
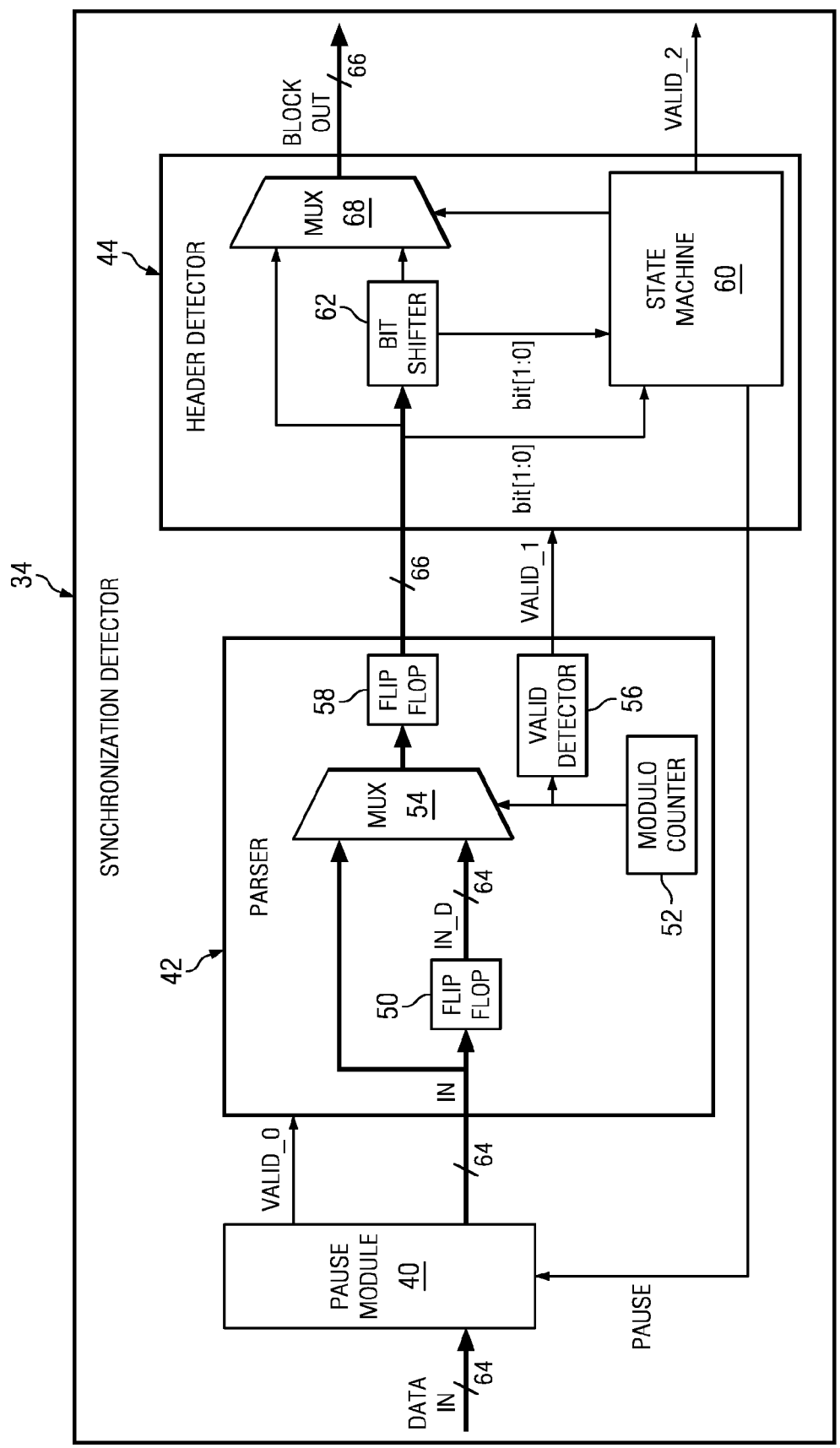
FIG. 3 illustrates a block diagram of an example synchronization detector, in accordance with embodiments of the present disclosure.

FIG. 3 illustrates a block diagram of an example synchronization detector 34, in accordance with embodiments of the present disclosure. As shown in FIG. 3, synchronization detector 34 may comprise a pause module 40, a parser 42, and a header detector 44. Pause module 40 may comprise any system, device, or apparatus configured to either pass an input datagram from its input to its output or discard an input datagram based on a pause signal communicated from header detector 44. For example, if the signal PAUSE not asserted, pause module 40 may pass a datagram received at its input to its output. Otherwise, if the signal PAUSE is asserted, pause module 40 may discard the datagram received at its input. Thus, pause module 40 may effectively serve as a one-clock data gapping state machine.

Pause module 40 may communicate non-discarded datagrams to parser 42 along with a VALID_0 signal indicating whether or not its output datagram is a valid datagram, or whether it is to be discarded (e.g., based on the PAUSE signal).

Parser 42 may be any system, device, or apparatus configured to convert a bus of valid datagrams of a first bit length (e.g., 40, bits, 64 bits, 1024 bits) received from pause module 40 into a bus of blocks of a second bit length (e.g., 66 bits, 1027 bits).

As shown in FIG. 3, parser 42 may include flip flops 50, 58, modulo counter 52, multiplexer 54, and valid detector 56. Each flip flop 50, 58 may comprise a system, device, or apparatus configured to synchronize variably-timed input signals to a clock or other reference timing signal (e.g., a clock), as is known in the relevant art. In certain embodiments, the VALID_0 signal received by parser 42 from pause module 40 may in effect serve as a clock enable signal for one or more of flip flops 50, 58, such that flip flops 50 and/or 58 may latch input data only when the VALID_0 signal indicates a valid input signal.

Modulo counter 52 may incrementally count from zero to a maximum value, after which modulo counter 52 may reset to zero and begin incrementing again. The maximum value of may be set based on block bit length generated by parser 42. For example, if $BW_1$ is the bus width prior to parser 42 and $BW_2$ is the bus width after parser 42, and MCF is the maximum commons factor of $BW_1$ and $BW_2$, the maximum value may be equal to $BW_2/MCF$. The output of modulo counter 52 may be communicated as a control input to multiplexer 54.

Figure 4:
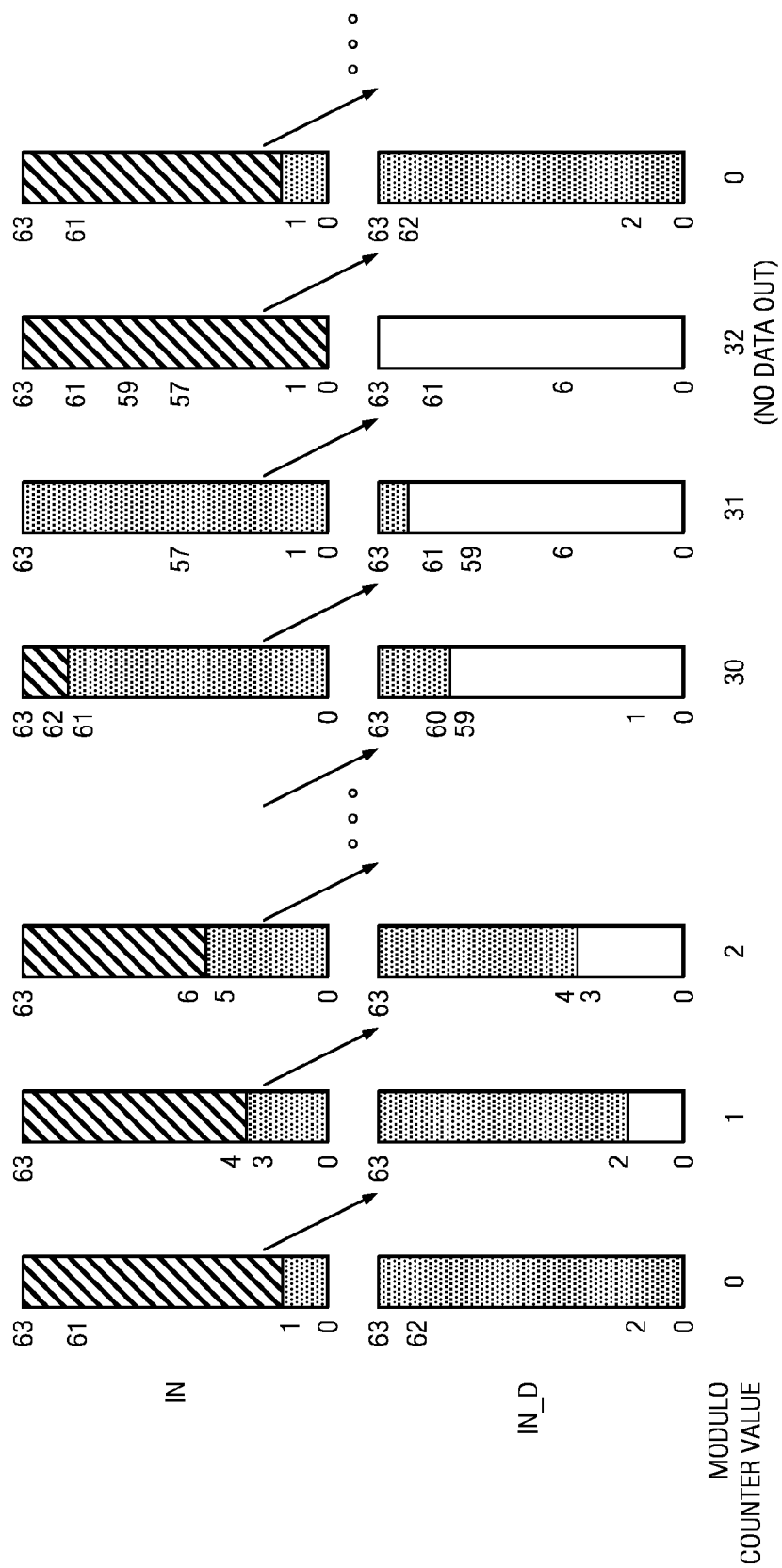
FIG. 4 illustrates example operation of a multiplexer of a parser, in accordance with embodiments of the present disclosure.

Multiplexer 54 may be any system, device, or apparatus configured to receive two datagrams each of a first bit length (e.g., 64 bits) and output a single datagram of a second bit length (e.g., 66 bits) based on a control signal received from modulo counter 52. FIG. 4 illustrates example operation of multiplexer 54, in accordance with embodiments of the present disclosure. As shown in FIG. 4, multiplexer 54 may receive as inputs a datagram from a previous clock cycle (from flip flop 50) and a datagram from a present clock cycle (the input to parser 42), as indicated in FIG. 4 by the datagrams IN and IN_D. From the two datagrams, multiplexer 54 may, based on the value of modulo counter 52, select a block (e.g., of 66 bits) as depicted in black. In addition, during a particular number of modulo block counter cycles, no portion of the input datagrams may contain a then-valid block. During such cycle, valid-detector 56 may output a signal VALID_1 from parser 42 indicating the output of multiplexer 54 is not valid. The VALID_1 signal may be deasserted for a number of clock cycles equal to $(BW_2/MCF)-(BW_1/MCF)$.

As an illustrative example of the operation of modulo counter 42, multiplexer 54, and valid-detector 64, for the 10G case, $BW_1=64$, $BW_2=66$, MCF=2, maximum modulo counter 62 value=66/2=33 and VALID_1 inactive for (66/2)-(64/2)=1 cycle. As another example, for the 40G case, $BW_1=1024$, $BW_2=1027$, MCF=1, maximum modulo counter 62 value=1027/1=1027 and VALID_1 inactive for (1027/1)-(1024/1)=3 cycles. As a further example, for the 100G case, $BW_1=40$, $BW_2=66$, MCF=2, maximum modulo counter 62 value=66/2=33 and VALID_1 inactive for (66/2)-(40/2)=13 cycles.

Header detector 44 may be any system, device, or apparatus configured to receive a block (e.g., 66 bits) from parser 42 and determine whether a block sync header is located at a particular bit position (e.g., at the beginning, end, or some other position within the block in which the block sync header is supposed to reside pursuant to the relevant communication standard or protocol), or within a maximum number of bit shifts from the particular bit position. The maximum number of bit shifts may be based upon the size of the sync block header. In some embodiments, the maximum number of bit shifts may be equal to N−1, wherein N equals the size in bits of the block sync header. Thus, for a 66-bit block with two-bit sync headers, the maximum number of bit shifts may be equal to one.

As depicted in FIG. 3, header detector 44 may include one or more bit shifters 62, a state machine 60, and a multiplexer 68. A bit shifter 62 may be configured to shift a block received at its input by a particular number of bits. In some embodiments, header detector 44 may include multiple bit shifters 62, wherein each bit shifter 62 provides a shift by a different number of bits. In these and other embodiments, the number of bit shifters 62 may be equal to N−1, wherein N is defined as follows:

$$N=|(BW_1 \times m - BW_2 \times n)|$$

where $BW_1$ is the bus width prior to parser 42, $BW_2$ is the bus width after parser 42, m is the number of datagrams dropped before parser 42 or number of pause cycles issued per pause command, n is the equivalent number of blocks dropped after parser 42 due to a pause command, wherein m and n are selected to minimize N.

Accordingly, N equals the net number of shifted buts per pause command. As an example, for the 10G case, $BW_1$=64, $BW_2$=66, best m=1, best n=1, and N=|(64×1)−(66×1)|=2. As another example, for the 40G case, $BW_1$=1024, $BW_2$=1027, best m=1, best n=1, and N=|(1024×1)−(1027×1)|=3. As a further example, for the 100G case, $BW_1$=40, $BW_2$=66, best m=5, best n=3, and N=|(40×5)−(66×3)|=2.

State machine 60 may be any system, device, or apparatus configured to determine whether a block sync header is present at a particular bit position of the block communicated by parser 42 or a bit-shifted version of such block as communicated by a bit shifter 62 and, based on such determination, communicate one or more control signals. For example, if state machine 60 determines that a block sync header is present at a particular bit position of the block communicated by parser 42 or a bit-shifted version of such block as communicated by a bit shifter 62, state machine 60 may: (i) communicate a control signal to multiplexer 68, such that multiplexer 68 may select the output block for header detector 44 from either of parser 42 or a bit shifter 62; (ii) assert a control signal VALID_2 indicating the output block of header detector 44 is valid; and (iii) deassert the control signal PAUSE communicated to PAUSE module 40. On the other hand, if the block sync header is not detected, state machine 60 may: (i) deassert a control signal VALID_2 indicating the output block of header detector 44 is invalid; and (ii) assert the control signal PAUSE communicated to PAUSE module 40.

As stated above, pause module 40 in concert with other components of synchronization detector 34, may effectively serve as a one-clock data gapping state machine. Thus, upon assertion of a PAUSE signal, synchronization detector 34 will effectively discard a valid datagram, which causes an effective bit slip or barrel shift in the potential sync header but position, such effective bit slip/barrel shift equal to the difference between the larger block size (e.g., 66) and the smaller datagram size (e.g., 64). By combining the effective bit slip/barrel shift with one or more bit shifters 62 providing bit shifts as described above, additional granularity may be provided (e.g., a single one-bit shifter 62 in the 64/66 bit case allows for both an odd and even number of bit shifts). As this pause/data gapping induced barrel shift effect is accumulative, synchronization detector 34 may effectively serve the function of a barrel shifter, without requiring the volume of logic required for barrel shifters in traditional approaches to sync header detection.

As noted above, although optical networks 10 are shown as a point-to-point optical network with terminal nodes, one or more of optical networks 10 may also be configured as a ring optical network, a mesh optical network, or any other suitable optical network or combination of optical networks, and may include any suitable number of intermediate nodes interfaced between the terminal nodes.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    receiving a stream of datagrams, the datagrams having a first bit length;
    selecting a block of bits from a plurality of consecutively-received datagrams, the block having a second bit length greater than the first bit length, wherein the block comprises a block synchronization header and wherein the block synchronization header comprises the difference between the second bit length and the first bit length;
    determining whether the block synchronization header is present at a particular bit position within the block;
    in response to determining that the block synchronization header is present at the particular bit position, outputting the block as a valid block; and
    in response to determining that the block synchronization header is not present at the particular bit position:
        discarding a received datagram from the stream of datagrams to cause a bit slip in the stream of datagrams by a number of bits equal to the difference between the second bit length and the first bit length;
        repeating the receiving, selecting, determining, and discarding steps until a determination is made that the block synchronization header is present at the particular bit position; and
        outputting the block as a valid block when the determination is made that the block synchronization header is present at the particular bit position.

2. A method according to claim 1, wherein the first bit length is equal to 64 and the second bit length is equal to 66.

3. A method according to claim 1, wherein the first bit length is equal to 1024 and the second bit length is equal to 1027.

4. A method according to claim 1, wherein determining whether the block synchronization header is present at a particular bit position in the block comprises determining whether the block synchronization header is present within a maximum number of bit shifts from the expected bit position.

5. A method according to claim 4, wherein outputting the block as a valid block comprising outputting the block bit shifted based at least on the number of bit shifts from the expected bit position the block synchronization header exists within the block.

6. An article of manufacture, comprising:
a computer readable medium; and
computer-executable instructions carried on the computer readable medium, the instructions readable by a processor, the instructions, when read and executed, for causing the processor to:
receive a stream of datagrams, the datagrams having a first bit length;
select a block of bits from a plurality of consecutively-received datagrams, the block having a second bit length greater than the first bit length, wherein the block comprises a block synchronization header and wherein the block synchronization header comprises the difference between the second bit length and the first bit length;
determine whether the block synchronization header is present at a particular bit position within the block;
in response to determining that the block synchronization header is present at the particular bit position, output the block as a valid block; and
in response to determining that the block synchronization header is not present at the particular bit position:
discard a received datagram from the stream of datagrams to cause a bit slip in the stream of datagrams by a number of bits equal to the difference between the second bit length and the first bit length;
repeat the receiving, selecting, determining, and discarding steps until a determination is made that the block synchronization header is present at the particular bit position; and
output the block as a valid block when the determination is made that the block synchronization header is present at the particular bit position.

7. An article according to claim 6, wherein the first bit length is equal to 64 and the second bit length is equal to 66.

8. An article according to claim 6, wherein the first bit length is equal to 1024 and the second bit length is equal to 1027.

9. An article according to claim 6, wherein determining whether the block synchronization header is present at a particular bit position in the block comprises determining whether the block synchronization header is present within a maximum number of bit shifts from the expected bit position.

10. An article according to claim 9, wherein outputting the block as a valid block comprising outputting the block bit shifted based at least on the number of bit shifts from the expected bit position the block synchronization header exists within the block.

11. A system, comprising:
a parser configured to:
receive a stream of datagrams, the datagrams having a first bit length; and
select a block of bits from a plurality of consecutively-received datagrams, the block having a second bit length greater than the first bit length, wherein the block comprises a block synchronization header and wherein the block synchronization header comprises the difference between the second bit length and the first bit length; and
a detector configured to:
determine whether the block synchronization header is present at a particular bit position within the block;
in response to determining that the block synchronization header is present at the particular bit position, output the block as a valid block; and
in response to determining that the block synchronization header is not present at the particular bit position:
discard a received datagram from the stream of datagrams to cause a bit slip in the stream of datagrams by a number of bits equal to the difference between the second bit length and the first bit length;
repeat the receiving, selecting, determining, and discarding steps until a determination is made that the block synchronization header is present at the particular bit position; and
output the block as a valid block when the determination is made that the block synchronization header is present at the particular bit position.

12. A system according to claim 11, wherein the first bit length is equal to 64 and the second bit length is equal to 66.

13. A system according to claim 11, wherein the first bit length is equal to 1024 and the second bit length is equal to 1027.

14. A system according to claim 11, wherein determining whether the block synchronization header is present at a particular bit position in the block comprises determining whether the block synchronization header is present within a maximum number of bit shifts from the expected bit position.

15. A system according to claim 14, wherein outputting the block as a valid block comprising outputting the block bit shifted based at least on the number of bit shifts from the expected bit position the block synchronization header exists within the block.

* * * * *